UNITED STATES PATENT OFFICE.

SAMUEL LEWIS SUMMERS, OF PHILADELPHIA, PENNSYLVANIA.

ACET SALICYL PHENETIDIN AND PROCESS OF MAKING SAME.

SPECIFICATION forming part of Letters Patent No. 706,356, dated August 5, 1902.

Application filed June 5, 1902. Serial No. 110,293. (No specimens.)

*To all whom it may concern:*

Be it known that I, SAMUEL LEWIS SUMMERS, a citizen of the United States, residing in the city of Philadelphia, State of Pennsylvania, have invented a certain new and useful Acet Salicyl Phenetidin and Process of Producing the Same, of which the following is a full, clear, and exact description.

My invention relates to the production of a new chemical compound having especial utility as a pharmaceutical product in that it possesses medicinal properties as an antineuralgic and antirheumatic, administered internally in doses of four to eight grains, and also has distinct antiseptic action externally applied.

My invention also comprises the process of producing the new substance.

My new product is chemically an acet salicyl paraphenetidin, having the formula $C_{17}H_{17}NO_4$, and is the crystalline derivative resulting from the reaction of acetic anhydrid as an acetylizing agent on a purified salicylate of paraphenetidin in the presence of xylene as a suitable solvent of the mixture, the resultant crystals being then isolated from the mother-liquor in a purified state by washing or recrystallizing from ethylic alcohol or other suitable volatile solvent.

The process by which I produce the new chemical body is as follows: I first make a pure salicyl paraphenetidin from one hundred and thirty-seven parts, by weight, of paraphenetidin, one hundred and thirty-eight parts, by weight, of salicylic acid, and fifty parts, by weight, of oxychlorid of phosphorus, these being heated together at about 100° centigrade for about two hours, the resulting mass being crystallized out of hot ethyl alcohol. This method results in giving a pure salicyl phenetidin. Of this I take two hundred and fifty-seven parts, by weight, adding to it one hundred and twenty-five parts, by weight, of acetic anhydrid, and preferably just enough xylene to dissolve the mixture when heated to its boiling-point. I keep the heat at this point from two to three hours, then allow to cool, separate the crystals which form thereby from the mother-liquor, and wash or recrystallize from ethylic alcohol or other suitable volatile solvent. The resultant crystals are pure white, tasteless, melt at about 85° centigrade, and are needle-like in structure, as they crystallize in needles rather than in plates, as do many phenetidin compounds. They are soluble in alcohol, ether, benzene, and chloroform.

Having thus described my invention, what I claim as new, and desire to secure by Letters Patent, is—

1. As a new pharmaceutical product, the acet salicyl paraphenetidin described, having the formula $C_{17}H_{17}NO_4$, melting at about 85° centigrade, forming in white needle-like crystals, tasteless, soluble in alcohol, ether, benzene and chloroform.

2. The process for producing the acet salicyl paraphenetidin described, which consists in first allowing oxychlorid of phosphorus to react on salicylic acid and paraphenetidin at a temperature of about 100° centigrade, and finally exhibiting the pure salicyl paraphenetidin thus formed to the action of acetic anhydrid, and purifying the resultant product by recrystallization.

In testimony whereof I have hereunto affixed my signature this 3d day of June, A. D. 1902.

SAMUEL LEWIS SUMMERS.

Witnesses:
H. R. HAGEN,
OLGA GUTJAHR.